(12) United States Patent
Boehm et al.

(10) Patent No.: US 11,842,080 B2
(45) Date of Patent: Dec. 12, 2023

(54) MEMORY DEVICE HEALTH EVALUATION AT A HOST DEVICE

(71) Applicant: Micron Technology, Inc., Boise, ID (US)

(72) Inventors: Aaron P. Boehm, Boise, ID (US); Mark D. Ingram, Boise, ID (US); Scott E. Schaefer, Boise, ID (US); Scott D. Van De Graaff, Boise, ID (US); Todd Jackson Plum, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 34 days.

(21) Appl. No.: 17/724,216

(22) Filed: Apr. 19, 2022

(65) Prior Publication Data

US 2022/0342604 A1    Oct. 27, 2022

Related U.S. Application Data

(60) Provisional application No. 63/180,465, filed on Apr. 27, 2021.

(51) Int. Cl.
*G06F 12/00* (2006.01)
*G06F 3/06* (2006.01)
*G06F 11/30* (2006.01)

(52) U.S. Cl.
CPC .......... *G06F 3/0659* (2013.01); *G06F 3/0604* (2013.01); *G06F 3/0679* (2013.01); *G06F 11/3058* (2013.01); *G06F 11/3065* (2013.01)

(58) Field of Classification Search
CPC ...... G06F 3/0679; G06F 3/0659; G06F 3/061; G06F 3/0604; G06F 3/0688; G06F 13/1668; G06F 3/0658; G06F 2212/1032; G06F 11/3466; G06F 11/3055; G06F 13/00; G06F 11/3058; G06F 11/30
See application file for complete search history.

(56) References Cited

U.S. PATENT DOCUMENTS

| | | | | |
|---|---|---|---|---|
| 7,861,122 | B2* | 12/2010 | Cornwell | G11C 29/56 714/42 |
| 9,983,828 | B2* | 5/2018 | Shen | G11C 29/42 |
| 10,921,984 | B2* | 2/2021 | Gupta | G06F 3/0653 |
| 2008/0034148 | A1* | 2/2008 | Gower | G06F 11/349 711/105 |

(Continued)

*Primary Examiner* — John A Lane
(74) *Attorney, Agent, or Firm* — Holland & Hart LLP

(57) ABSTRACT

Methods, systems, and devices for memory device health evaluation at a host device are described. The health evaluation relates to a host device that is associated with a memory device that monitors and reports health information, such as one or more parameters associated with a status of the memory device. The memory device may transmit the health information to the host device, which may perform one or more operations and may transmit the health information to a device of another entity of a system (e.g., ecosystem) including the host device. The host device may include one or more circuits for transmitting and processing the health information, such as a system health engine, a safety engine, a communication component, or a combination thereof. Based on a determination by the host device or information received from an external device, the host device may transmit a command to the memory device.

28 Claims, 8 Drawing Sheets

(56) References Cited

U.S. PATENT DOCUMENTS

| | | | |
|---|---|---|---|
| 2013/0159797 A1* | 6/2013 | Peng | G11C 16/349 714/E11.001 |
| 2014/0122777 A1* | 5/2014 | Oh | G06F 3/0661 711/103 |
| 2016/0141029 A1* | 5/2016 | Navon | G06F 3/0659 365/148 |
| 2021/0182141 A1* | 6/2021 | Balb | G06F 11/3037 |
| 2022/0012148 A1* | 1/2022 | Plum | G06F 11/3075 |
| 2022/0100427 A1* | 3/2022 | Boehm | G06F 3/0659 |
| 2022/0317916 A1* | 10/2022 | Boehm | G06F 3/0604 |
| 2022/0413737 A1* | 12/2022 | Veluswamy | G06F 3/0679 |

* cited by examiner

US 11,842,080 B2

MEMORY DEVICE HEALTH EVALUATION AT A HOST DEVICE

CROSS REFERENCE

The present Application for Patent claims priority to U.S. Provisional Patent Application No. 63/180,465 by Boehm et al., entitled "MEMORY DEVICE HEALTH EVALUATION AT A HOST DEVICE", filed Apr. 27, 2021, which is assigned to the assignee hereof, and which is expressly incorporated by reference in its entirety herein.

FIELD OF TECHNOLOGY

The following relates generally to one or more systems for memory and more specifically to memory device health evaluation at a host device.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
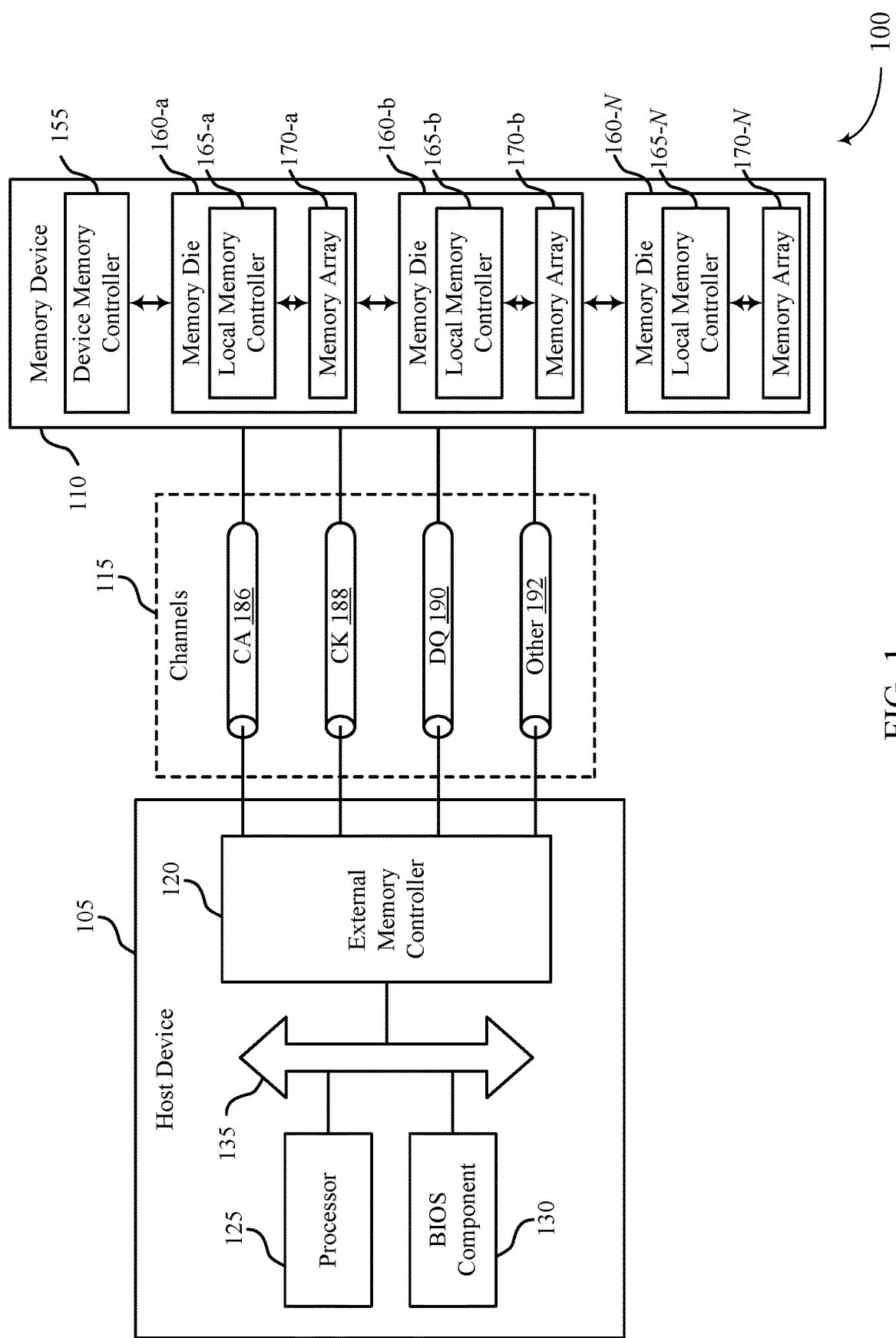
FIG. 1 illustrates an example of a system that supports memory device health evaluation at a host device in accordance with examples as disclosed herein.

A memory device may be in communication with, be coupled with, or be included in a host device (e.g., a vehicle, computer, or cell phone). Different usage and environmental conditions of the memory device may vary between different categories of host devices, as well as between different host devices in a same category based a duration that the memory device is used, how the memory device is used, operations conditions in which the memory device is used, etc. As such, a usage level (e.g., level of wear), a remaining lifetime, or a general degradation of a memory device may be unknown to the memory device or the host device or both. In such cases, the memory device may experience performance degradation, or failure, without the detection by the memory device or the host device or both, which may result in failure or degradation of the memory device, or failure or degradation of one or more portions of a system including the memory device or the host device. Additionally or alternatively, servicing and replacement schedules of the memory device or the host device, one or more manufacturing parameters of the memory device, or one or more manufacturing parameters of the host device, among other examples, may be based on inaccurate data due to the lack of data regarding the usage level of the memory device.

The present disclosure provides techniques for a device, such as a host device (e.g., a vehicle), to include, be coupled with, or use a memory device that monitors and reports health information (e.g., one or more parameters associated with a status of the memory device). The memory device may transmit the health information to the host device, and the host device (e.g., a vehicle or a computer or system-on-a-chip (SoC) of the vehicle) may process the health information, or transmit the health information to another entity of a larger system, or both. In some cases, the other entity of the system may receive the health information and transmit a signal back to the host device based on the health information (e.g., indicating one or more parameters for implementation at the memory device or the host device). In some cases, the host device may receive and process the health information using one or more components, to determine a status of the memory device and to determine one or more operational parameters for the memory device. For example, the host device may include a system health engine used for receiving health information from the memory device, and a safety engine used for processing the health information. In some cases, the host device may also include a communication component used for sending and receiving health information from the outside entities. Receiving and processing health information in real time from the memory device may support an increased accuracy for servicing and repair schedules, increased safety for a system including the host device and the memory device, increased accuracy for one or more manufacturing or design parameters of the memory device or host device (e.g., the vehicle or associated computers), or any combination thereof.

Features of the disclosure are initially described in the context of systems and dies as described with reference to FIGS. 1 and 2. Features of the disclosure are described in the context of a system and a process flow as described with reference to FIGS. 3 and 4. These and other features of the disclosure are further illustrated by and described with reference to an apparatus diagram and flowcharts that relate to memory device health evaluation at a host device as described with reference to FIGS. 5-8.

FIG. 1 illustrates an example of a system 100 that supports memory device health evaluation at a host device in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110). The memory subsystem or system 100 may, in some cases, be referred to as a memory device 110 or memory devices 110.

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105. As described herein, the host device 105 may receive information (e.g., health information, related to a status of a memory device 110) from a memory device 110. The host device 105 may make one or more determinations based on the information, or may forward the information to one or more other devices in a system that includes or is in communication with the host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a secondary-type or dependent-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

In some examples, the system 100 or the host device 105 may include various peripheral components. The peripheral components may be any input device or output device, or an interface for such devices, that may be integrated into or with the system 100 or the host device 105. Examples may include one or more of: a disk controller, a sound controller, a graphics controller, an Ethernet controller, a modem, a universal serial bus (USB) controller, a serial or parallel port, or a peripheral card slot such as peripheral component interconnect (PCI) or specialized graphics ports. The peripheral component(s) may be other components understood by a person having ordinary skill in the art as a peripheral.

In some examples, the system 100 or the host device 105 may include an I/O controller. An I/O controller may manage data communication between the processor 125 and the peripheral component(s), input devices, or output devices. The I/O controller may manage peripherals that are not integrated into or with the system 100 or the host device 105. In some examples, the I/O controller may represent a physical connection or port to external peripheral components.

In some examples, the system 100 or the host device 105 may include an input component, an output component, or both. An input component may represent a device or signal external to the system 100 that provides information, signals, or data to the system 100 or its components. In some examples, and input component may include a user interface or interface with or between other devices. In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

The memory device 110 may include a device memory controller 155 and one or more memory dies 160 (e.g., memory chips) to support a desired capacity or a specified capacity for data storage. Each memory die 160 (e.g., memory die 160a, memory die 160b, memory die 160N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies 160 may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105. The memory device 110 may include (e.g., within dedicated circuitry or as a part of a controller, such as the local memory controller 165 or device memory controller 155) health monitoring circuitry. The memory device 110 may use the health monitoring circuitry to monitor and determine one or more parameters indicative of a status of the memory device, such as with relation to operation and access of memory cells within a memory array 170. The memory device may transmit the one or more parameters to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of the system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths to decode one or more of address or command data (e.g., eight or nine signal paths).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be x4 (e.g., including four signal paths), x8 (e.g., including eight signal paths), x16 (including sixteen signal paths), etc.

Figure 2:
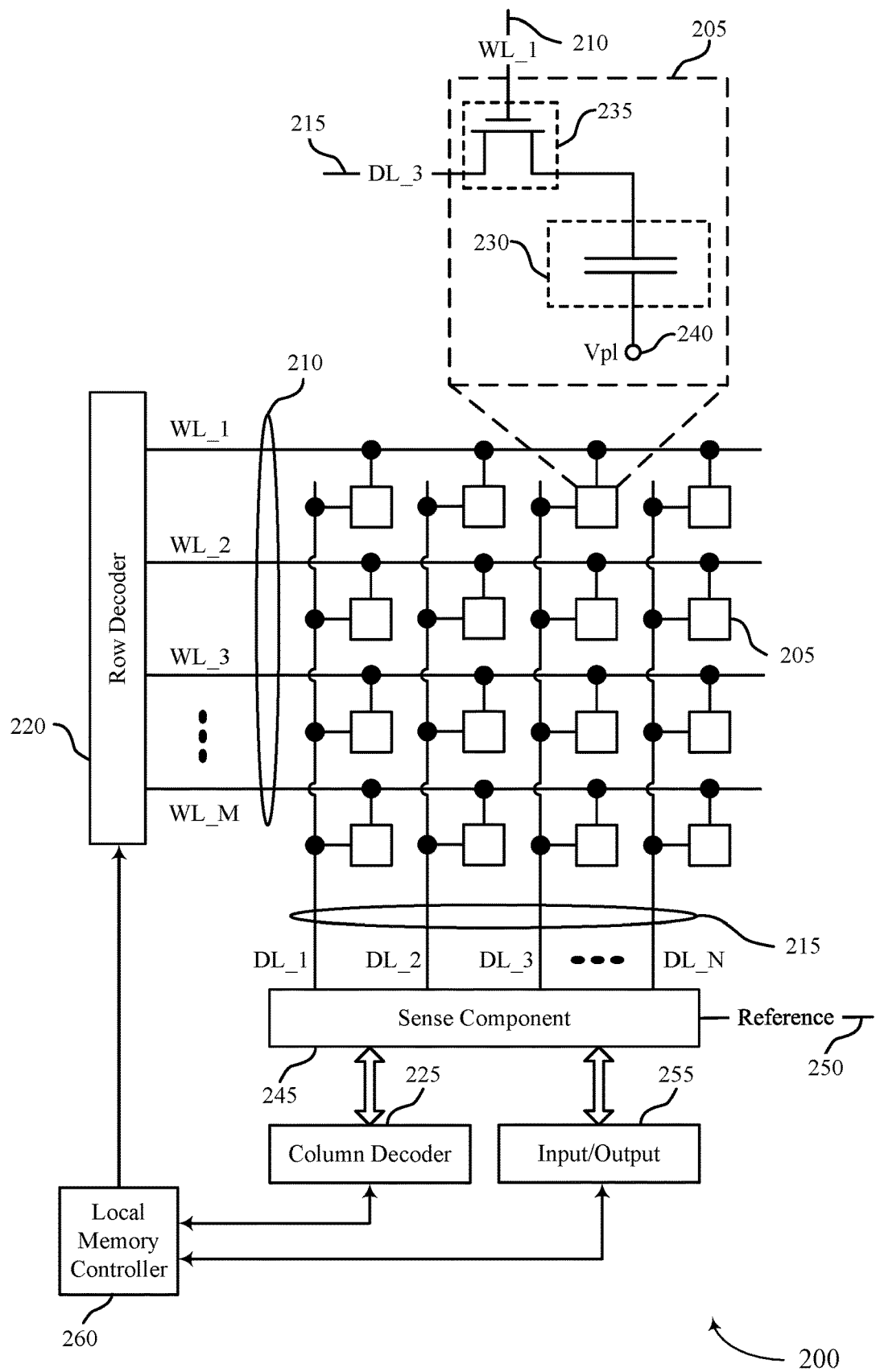
FIG. 2 illustrates an example of a memory die that supports memory device health evaluation at a host device in accordance with examples as disclosed herein.

FIG. 2 illustrates an example of a memory die 200 that supports memory device health evaluation at a host device in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

As describe herein, a memory device that includes the memory die 200 may transmit health information to a host device, and the host device may perform one or more operations (e.g., may determine one or more parameters for the memory device). In some cases, the host device may include a set of components for receiving, processing, and transmitting the health information. For example, the host device may include a system health engine, a safety engine, and/or a communication component. In some examples, the communication component may transmit the health information to another entity of a system that includes the host device. In some cases, the other entity of the system may receive the health information and transmit a signal back to the host device based on the health information (e.g., indicating one or more parameters for implementation at the host device, or the memory device, or both). In some cases, the host device may receive and process the health information using one or more components, to determine a status of the memory device and to determine one or more operational parameters for the memory device.

Figure 3:
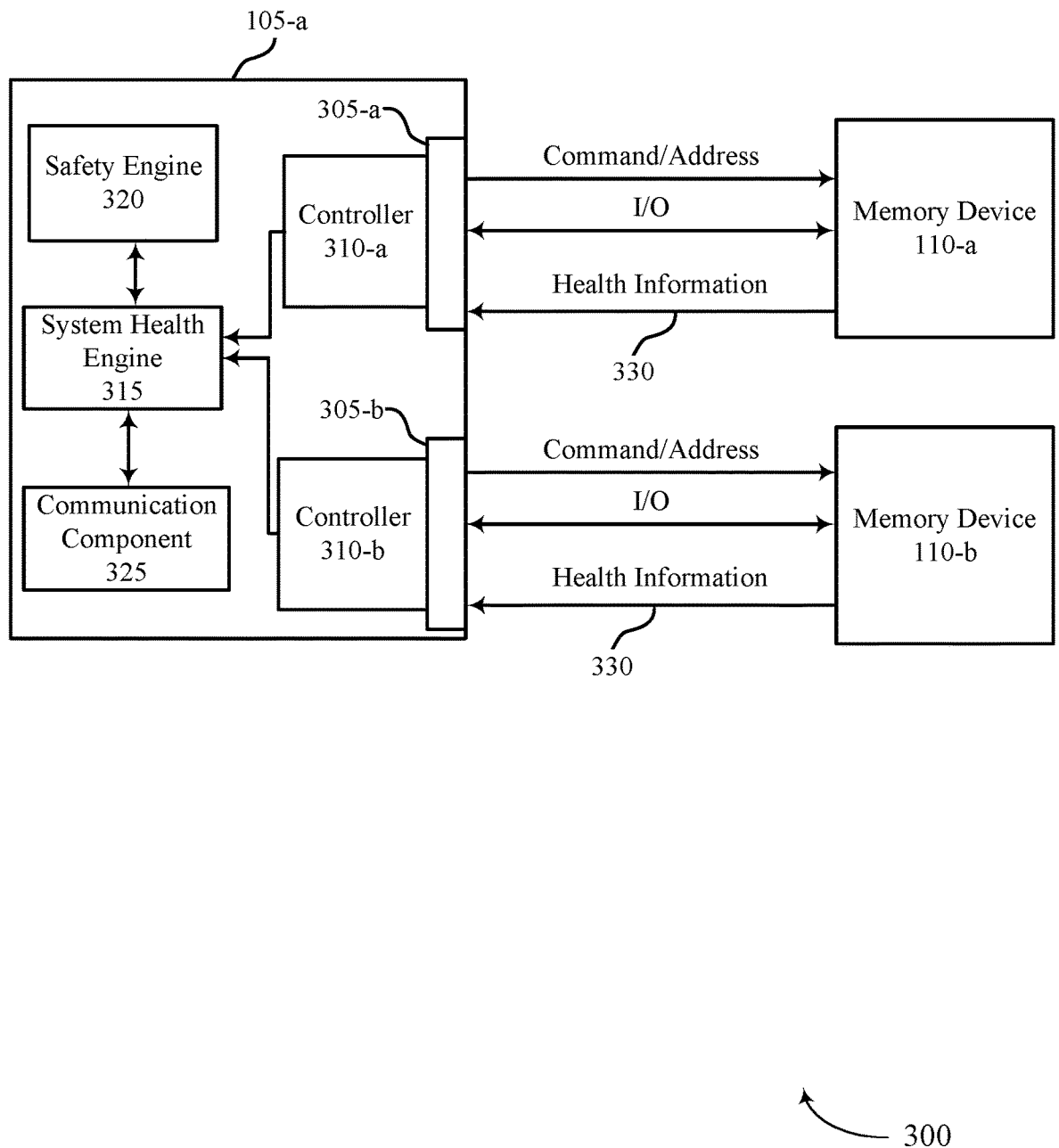
FIG. 3 illustrates an example of a system that supports memory device health evaluation at a host device in accordance with examples as disclosed herein.

FIG. 3 illustrates an example of a system 300 that supports external system reporting for health monitoring in accordance with examples as disclosed herein. The system 300 may include a host device 105-a, which may be an example of a host device 105 as described with reference to FIG. 1. The host device 105-a may represent one or more computers or SoCs, and may include or be coupled with one or more memory devices 110 (e.g., memory devices 110-a and 110-b) as described with reference to FIG. 1. For example, the host device 105-a may represent an SoC, or may represent a separate component, such as a dedicated safety component, of a device. In such cases, the host device 105-a may represent a standalone chip or processor that receives health information but not other data from the memory device(s) 110. In some cases, the system 300 may support communicating health information 330 monitored at one or more memory devices 110, such as the memory devices 110-a and 110-b (e.g., communicating one or more parameters indicative of a status of the memory devices 110-a and 110-b). The health information 330 (e.g., output by the memory devices 110-a and 110-b) may be used by the host device 105-a and one or more other entities (e.g., one or more other devices associated with the one or more entities) as described herein.

The host device 105-a may be an example of an SoC (e.g., associated with a vehicle or other device). Although the system 300 is described herein with reference to a host device 105-a associated with a vehicle, it is to be understood that the examples may also apply to other host devices 105 (e.g., to data center computers, secure laptops) without departing from the scope of the present disclosure. Similarly, the examples of the entities of the system 300 described herein may also apply to other entities associated with such host devices 105, or other entities associated with the host device 105-a, without departing from the scope of the present disclosure.

Usage and environmental conditions may vary between host devices 105 (e.g., different or same types of host devices 105). As such, a usage level (e.g., level of wear), a remaining lifetime, or a general degradation of memory devices 110 associated with a host device 105 may be unknown to the memory devices 110 or the host device 105. In such cases, a memory device 110 may begin to experience performance degradation or failure without the knowledge of the memory device 110 or the host device 105, which may result in failure of the memory device 110 or failure of one or more portions or entities of the system 300. Usage or wear parameters of the memory device 110 may thus be unknown to the memory device 110 or the host device 105. As such, servicing and replacement schedules of the memory device 110 or host device 105, one or more manufacturing parameters or the memory device 110, or one or more manufacturing parameters of the host device 105, among other examples, may be based on inaccurate data.

The present disclosure provides techniques for a host device 105 (e.g., host device 105-a) to receive health information 330 (e.g., information regarding circuit degradation, compromised data integrity, usage, voltage levels, etc.) from one or more memory devices 110 (e.g., memory device 110-a, 110-b, or both), for example, using one or more dedicated components (e.g., circuitry) of the host device 105-a and the memory device(s) 110. The memory device(s) 110 may store the health information 330 (e.g., one or more parameters indicative of the status of the memory device 110) at the memory device(s) 110, or may transmit the health information 330 to the host device 105-a. In some examples, the memory device may determine the health information using a monitoring component or circuitry that may, for example, be configured to monitor and output information associated with a health or other status of the memory device 110.

The host device 105-a may include components such as a system health engine 315, a safety engine 320, and a communication component 325. Each of these components may represent one or more respective circuits of the host device 105-a, which may be configured to perform functions associated with the respective component as described herein. Further, the host device 105-a may include a set of controllers 310-a and 310-b (e.g., logic for controlling communications with the memory device(s) 110), as well as corresponding sets of pins 305-a and 305-b. In some examples, each set of pins 305 may be coupled with a corresponding memory device 110 and each controller 310 may thereby be coupled with the corresponding memory device 110. For example, controller 310-a may be coupled with memory device 110-a via pin 305-a, which may be coupled with memory device 110-a via one or more traces, wires, or other electrical components, while controller 310-b may be coupled with memory device 110-b via pin 305-b, which may similarly be coupled with memory device 110-b via one or more traces, wires, or other electrical components.

Each controller 310 may each be coupled with the system health engine 315 and may be configured to transmit or send the health information 330 to the system health engine 315. The system health engine 315 may be coupled with the safety engine 320, and the system health engine 315 and safety engine 320 may be configured to send the health information 330 (e.g., or associated information) to one another. The system health engine 315 may further be coupled with the communication component 325, and the system health engine 315 and communication component 325 may be configured to send the health information 330 (e.g., or associated information) to one another. In some examples, each controller 310 may be directly coupled with the safety engine 320, the communication component 325, or both (e.g., in addition to being coupled with the system health engine 315). In such examples, each controller 310 may, for example, be configured to send the health information 330 directly to the safety engine 320, the communication component 325, or both.

In some examples, one or more operational parameters, or other determinations made by a component of the host device 105-a, may be communicated or sent to the system health engine 315, the communication component 325, or a corresponding controller 310, for further analysis, communication to the memory device(s) 110 or another device, or both. For example, the system health engine 315 may, based on one or more determinations, transmit a command to one or more of the memory devices 110 indicating the operational parameter(s), a determination, or both. Additionally or alternatively, the safety engine may send an indication of the operational parameter(s), a determination, or both, to the system health engine 315, or to a corresponding controller 310, for transmission to one or more of the memory device 110.

In some cases, the memory device(s) 110 may store the health information 330 at a register of the memory device(s) 110 (e.g., an external register, a mode register), and the host device 105-a may access the register and the associated health information 330. For example, the host device 105-a may access the register via a controller 310-a or 310-b corresponding to memory device 110-a and 110-b, respectively. Additionally or alternatively, the memory device(s) 110 may determine to transmit the health information 330 to the host device 105-a and may transmit the health information 330 to the host device 105-a. The host device 105-a may use the health information 330, for example, to track or estimate a lifetime of the memory devices 110 or to adjust one or more parameters (e.g., operational parameters) of the memory devices 110, among other examples. In some examples, the operational parameters may include a voltage level of the memory devices 110, a quantity of access operations for a component of the memory devices 110, an operating temperature of a component of the memory devices 110, or a combination thereof.

In some examples, the controllers 310 may be coupled with the memory devices 110 via the corresponding pin 305-a or 305-b (e.g., one or more pins for a physical channel). In some cases (e.g., when the host device 105-a represents an SoC), the pins 305 may be configured to communicate command/address (C/A) and I/O information (e.g., data) with the memory device(s) 110. Further, the pins 305 may be configured to receive the health information 330 from the memory device(s) 110 and transmit, via the controllers 310, the health information 330 to one or more components of the host device 105-a. For example, the controller 310 may transmit the health information 330 to a system health engine 315. Additionally or alternatively, the safety engine 320, the communication component 325, or both, may be configured to receive the health information 330 from the controllers 310 (e.g., without being routed through the system health engine 315). In some cases, a data bus (e.g., for transmitting and receiving data) from the memory device(s) 110 may be routed to an SoC and the health information 330 may be routed to the host device 105-a (e.g., when the host device 105-a represents a safety component). In some cases, the data bus and the health information 330 from the memory device(s) 110 may be routed to the host device 105-a (e.g., when the host device 105-a represents an SoC).

The system health engine 315 may process the health information 330 to determine the status of the memory device(s) 110. In some cases, the status may indicate one or more safety critical results that may be used to manage the host device 105-a or a larger system that includes the host device 105-a. The safety critical results may include temperature information, memory cell failure, or other parameters that may affect the safety of the host device 105-a or larger system. The system health engine 315 may be coupled with the safety engine 320 and the communication component 325. In some cases, the system health engine 315 may make determinations (e.g., determine operational parameters for the memory device(s) 110, the host device 105-a, or the larger system) based on the health information 330. The system health engine 315 may process the health information 330 to be readable at other components of the host device 105-a, or to be readable at one or more other devices. For example, the system health engine 315 may be configured to transmit the status of the memory device(s) 110, the health information 330, or both to either the safety engine 320, the communication component 325, or both, based on processing the health information 330 to make the health information 330 readable to the other components. In some cases, processing the health information 330 for readability at another component or device may include transforming raw health data into one or more codes, bit sequences, or the like.

In some cases, the system health engine 315 may receive configurations or information for managing the health information 330. For example, the system health engine 315 may receive such configurations or information indicating whether the health information 330 is to be transmitted to the safety engine 320, the communication component 325, or both. In some examples, the system health engine 315 may receive configurations or information for managing health information 330 from outside devices, such as an entity associated with a roadway or other construction entity (e.g., a government-operated construction entity) that monitors vehicle activity. In such examples, the configurations or information may be initially received at the communication component 325, and transmitted to the system health engine 315. In some examples, the system health engine 315 may receive configurations or information for managing health information 330 (e.g., one or more parameters for evaluating the health information 330) from outside devices or from another component (e.g., a controller or processor) of the host device 105-a.

For example, the communication component 325 may receive the parameter(s) to evaluate the health information 330 from one or more devices external to the host device 105-a (e.g., a device including the host device 105-a, another device), for example, in response to transmitting the health information 330, based on other communications with the host device 105-a (e.g., based on a start up or other procedure), or based on one or more other criteria. For example, the communication component 325 may receive, from the one or more other devices, a threshold status of the memory device(s) 110, one or more parameters for monitoring at the memory device, one or more processes for determining the one or more operational parameters, or both. In some cases, one or more similar parameters may be received at the system health engine or the communication component 325 from another component of the host device 105-a.

In some cases, the system health engine 315 may transmit the safety critical results to the safety engine 320, for example, if the health information 330 is associated with one or more safety or critical functions of the host device 105-a or of the larger system. A safety critical result may represent, for example, a result determined or otherwise identified by the system health engine 315 that may indicate a failure of a portion or component of the memory device 110, may indicate a degradation of a portion or component of the memory device 110, or may indicate another parameter (e.g., one or more parameters that satisfy a threshold). The failure, the degradation, or the parameter may indicate a lower level of safety for the memory device 110, the host device 105-a, the larger system, or any combination thereof, and may also indicate or be related to one or more results that may affect a safety level of the memory device 110, the host device 105-a, the larger system, or any combination thereof.

In some examples, the system health engine 315 may transmit the health information 330 to the safety engine 320 based on, for example, a threshold of a parameter, the status of the memory device meeting a threshold, a type of parameter received, or a combination thereof (e.g., among other examples). Further, the system health engine 315 may similarly transmit the health information 330 to the communication component 325 based on a threshold of a parameter, the status of the memory device meeting a threshold, a type of parameter received, or a combination thereof. The safety engine 320 may evaluate the health information 330, in relation to the safety of the host device 105-a or the larger system, and may make determinations (e.g., determine operational parameters) based on the health information 330. For example, the safety engine 320 may determine that a set of memory cells in the memory device(s) 110 are no longer functional, and may that the memory device(s) 110 should no longer use the set of memory cells. The operational parameters, or other determinations, may be communicated back to the system health engine 315, the communication component 325, or the corresponding controller 310, for further analysis, communication to the memory device(s) 110 or another device, or both. For example, the system health engine 315 may, based on the determinations, transmit a command to the memory device(s) 110 indicating the operational parameters, the determinations, or both.

The system health engine 315 may also process the health information 330 to determine safety or non-safety critical results. For example, the system health engine 315 may process the health information 330 to determine servicing and replacement schedules (e.g., maintenance scheduling). In some cases, the system health engine 315 may transmit the safety critical results, the non-safety critical results, or both, to one or more entities outside the host device 105-a, for example, via the communication component 325. For example, the safety engine 320, the communication component, or both may be coupled (e.g., via direct connections) to the controllers 310.

In some cases, the communication component 325 may communicate health information 330, as received from the system health engine 315 or directly from the controller 310, to one or more devices external to the host device 105-a (e.g., devices associated with an entity of the larger system, such as other vehicles or a manufacturer database). For example, the host device 105-a may be part of a vehicle in a fleet of vehicles (e.g., a fleet of shipping trucks). The communication component 325 may transmit health information 330 to other vehicles in the fleet if the vehicle experiences a mechanical failure. Further, the communication component 325 may communicate health information 330 with devices within the vehicle itself (e.g., one or more devices associated with or coupled with the host device 105-a). The communication component 325 may additionally transmit health information 330 to a provider of the memory device(s) 110 or of the host device 105-a.

In response to communicating the health information 330 to the one or more devices external to the host device, the communication component 325 may receive information from the one or more devices external to the host device. For example, the communication component 325 may receive one or more operational parameters for operating one or more of the memory devices 110. The communication component 325 may send the information to another component of the host device 105-a (e.g., to the system health engine 315 or to a controller 310). The information may be transmitted to the memory devices 110 based on receiving the information at the system health engine 315, which may forward the information to a respective controller 310 such that the controller may transmit the information to a corresponding memory device 110. In some examples (e.g., when the communication component 325 is directly coupled with the controllers 310), the communication component 325 may transmit the information to a corresponding controller 310, and the controller 310 may transmit the information to the respective memory device 110.

In some cases, functions performed by the system health engine 315 and the safety engine 320 may be performed by one or more other circuits. In some cases, one circuit, or a combination of circuits, may be configured to perform the combined functions of these two engines.

Figure 4:
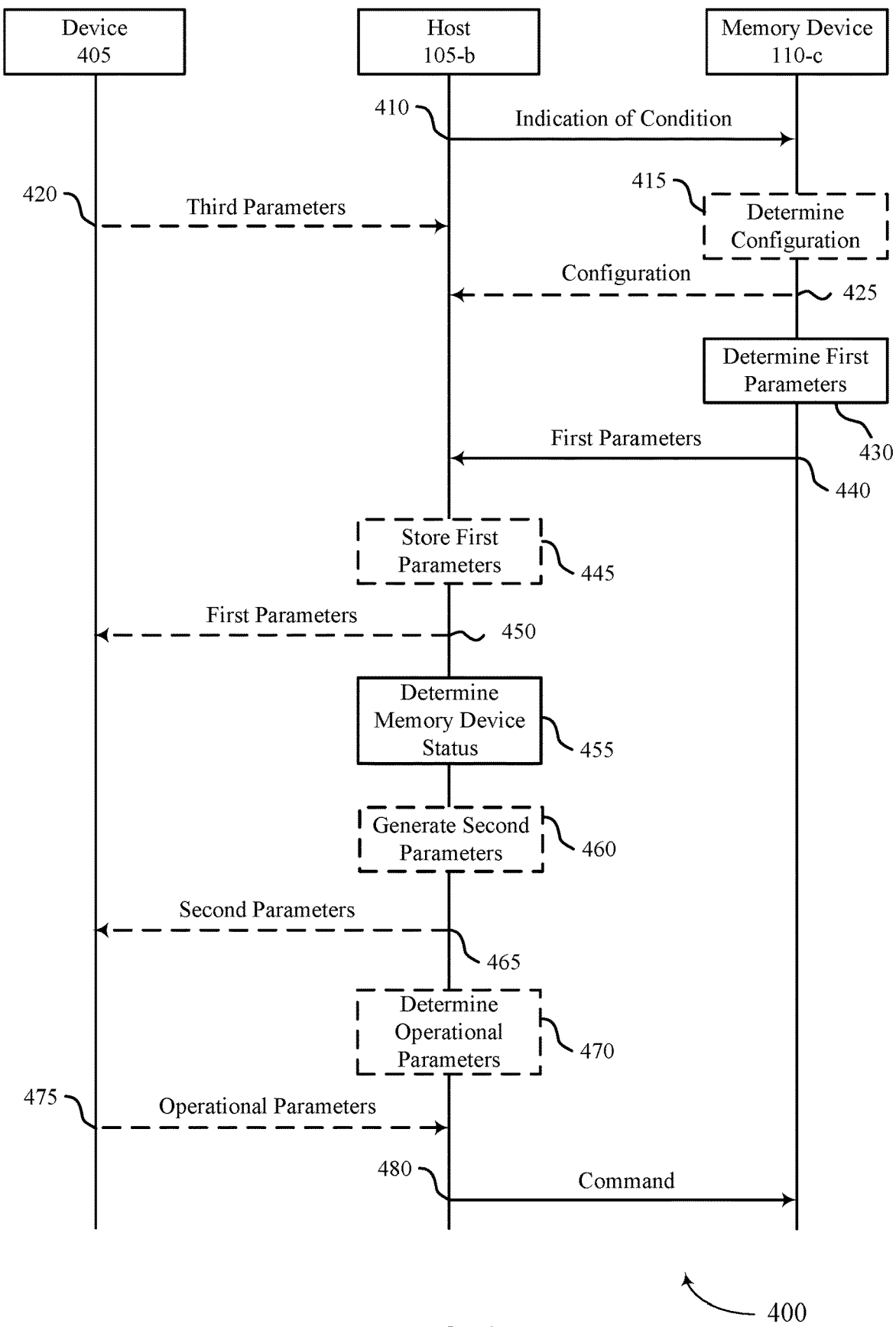
FIG. 4 illustrates an example of a process flow that supports memory device health evaluation at a host device in accordance with examples as disclosed herein.

FIG. 4 illustrates an example of a process flow 400 that supports external system reporting for health monitoring in accordance with examples as disclosed herein. The process flow 400 may be implemented by a host device 105-b and a memory device 110-c, which may be examples of the respective devices described with reference to FIGS. 1-3. The host device 105-b and the memory device 110-c may be coupled via a physical or logical bus, such as channels 115, that may support signaling between the devices. The memory device 110-c may illustrate an example of an apparatus that includes an array of memory cells couplable to a set of pins (e.g., bus) with a processor or an SoC (e.g., of the host device 105-b) and configured to operate in response to commands from the processor or the SoC.

The process flow 400 may also be implemented by a device 405, which may be an example of an external device described in reference to FIG. 3. The device 405 may, for example, be associated with a roadway or other construction entity (e.g., government-operated construction entity) that monitors vehicle activity. In some cases, the device 405 may be an entity, or may be controlled by an entity, which may also operate a data center (e.g., to store data used in national time-to-failure models). The device 405 (e.g., one or more devices thereof) may receive data, such as memory health information, from multiple vehicles. For example, the device 405 may monitor a remaining life on vehicle systems (e.g., safety-critical systems, such as memory) for safety purposes. In some cases, the device 405 may additionally collect population data about vehicles within an area for various applications (e.g., traffic predictions). The host device 105-b may be operable to communicate with the device 405 via a communication component (e.g., a communication component 325 as described with reference to FIG. 3), which may transmit electrical or wireless signals to the device 405.

In the following description of process flow 400, the operations may be performed in a different order than the order shown, or the operations performed by memory device 110-c, host device 105-b, and the device 405 may be performed in different orders or at different times. For example, some operations may also be left out of process flow 400, or other operations may be added to process flow 400. Although memory device 110-c, host device 105-b, and the device 405 are shown performing the operations of process flow 400, some aspects of some operations may also be performed by one or more other devices.

At 410, in some cases, the memory device 110-c may receive from the host device 105-b an indication of a condition of the host device 105-b to communicate the one or more first parameters from the memory device 110-c. In some cases, the condition may indicate that the first circuit of the host device may be operable to receive the one or more parameters from the memory device 110-c according to a configuration indicated by the memory device. For example, the condition may indicate that the host device 105-b is configured as a controlled device for communicating health information, or that the memory device 110-c is configured as a controller device for communicating health information, or both.

The one or more first parameters may be associated with a status of the memory device 110-c (e.g., a health, degradation, or remaining life status). For example, the first parameter(s) may represent health information, or a portion of health information, as described with reference to FIG. 3. The health information (e.g., the one or more first parameters) may, for example, be determine by a health monitoring circuit or component of the memory device 110-c and may be indicative of a status of the memory device 110-c, or one or more components or circuits thereof.

At 415, in some cases, the memory device 110-c may determine a configuration that may include a content of the one or more first parameters based on the condition of the host device. The content may be a type of the first parameter(s), an amount of the first parameter(s), an amount of data associated with the first parameter(s), or any combination thereof (e.g., among other examples). Additionally or alternatively, the configuration may include an order or sequence for transmitting the one or more first parameters based on the condition of the host device.

At 420, a first circuit of the host device 105-b (e.g., the system health engine 315 described with reference to FIG. 3) may receive information related to processing health information from the memory device 110-c. For example, the host device 105-b may receive one or more third parameters, the third parameter(s) indicating a threshold status of the memory device, one or more parameters for monitoring at the memory device, one or more respective thresholds for the one or more first parameters, one or more processes, or a combination thereof for determining one or more operational parameters (e.g., one or more trip points, sense levels, voltage levels, time periods, or any combination thereof, for operation of the memory device 110-c). The first circuit may receive the one or more third parameters at 420 from the device 405 or from another circuit of the host device 105-b, among other examples. In some cases, a status of the memory device 110-c may be determined based at least in part on the one or more third parameters received at 420.

At 425, the memory device 110-c may transmit, to the host device 105-b, the determined configuration for communicating the one or more parameters, which may be based on the condition of the host device 105-b. For example, the memory device 110-c may indicate the content or the order of the one or more first parameters to the host device 105-b via the configuration. In some cases, the configuration may also indicate one or more other communication parameters for communicating health information from the memory device 110-c to the host device 105-b.

At 430, the memory device 110-c may determine one or more parameters (e.g., the one or more first parameters) indicative of a status of the memory device. For example, the memory device 110-c may determine the one or more first parameters using a dedicated component or dedicated circuitry of the memory device 110-c. Determining the one or more first parameters may be based on monitoring the one or more first parameters using the dedicated component or circuitry, for example, while the memory device 110-c is operating.

At 440, the memory device 110-c may transmit, to the host device 105-b, the one or more first parameters indicative of the status of the memory device. For example, in some cases, the memory device 110-c may transmit the one or more first parameters based on the condition of the host device, based on determining the one or more first parameters indicative of the status of the memory device, based on the configuration determined at 415, or any combination thereof. In some cases, the host device 105-b may receive also receive a set of one or more parameters (e.g., fourth parameter(s)) from a second memory device indicative of a status of the second memory device. For example, the host device 105-b may receive the set of fourth parameters sequentially to the one or more first parameters. As described herein (e.g., with reference to FIG. 3), the host device 105-b may receive the first parameter(s) or fourth parameter(s) via a respective set of pins and associated controller of the host device 105-b.

At 445, in some cases, the host device 105-b may store data indicative of the one or more first parameters at non-volatile storage coupled with or included in the host device, based on receiving the one or more first parameters. In some cases, the one or more first parameters may be sent to a third circuit of the host device (e.g., the communication component 325 described with reference to FIG. 3) based on receiving the one or more first parameters. For example, the third circuit may receive the first parameter(s) via the first circuit or directly from the respective controller, as described with reference to FIG. 3. In some cases, the third circuit may communicate with one or more devices external to the apparatus (e.g., the device 405). In some cases, the third circuit may, at 450, transmit the one or more first parameters to the device 405 based on receiving the one or more first parameters. In some cases, the device 405 may be associated with a type of information indicated by the one or more first parameters (e.g., may be associated with an entity that uses or process the type of information indicated by the one or more first parameters).

In some examples, the host device 105-b may include a second circuit (e.g., the safety engine 320 described with reference to FIG. 3). In some cases, the one or more first parameters may be sent to the second circuit of the host device based on receiving the one or more first parameters. For example, the second circuit may receive the first parameter(s) via the first circuit or directly from the respective controller, as described with reference to FIG. 3.

At 455, the host device 105-b may determine the status of the memory device based the one or more first parameters. In some cases, the determining may be performed at the first circuit of the host device 105-b. In some cases, determining the status of the memory device may include identifying a code represented by the one or more first parameters, the code indicative of the status of the memory device. In some cases, the host device 105-b may determine, at the first circuit, the status of the second memory device based at least in part on the one or more fourth parameters associated with the second memory device. In some cases, the status of the memory device 110-c may further be based on the one or more fourth parameters associated with the second memory device.

In some cases, the first circuit (e.g., the system health engine 315) may perform the determining. Further, the first circuit may be configured for processing information indicative of the status of the memory device, indicative of a level of safety of the host device 105-b, or both.

At 460, the host device 105-b (e.g., the first circuit) may generate one or more second parameters indicative of the status of the memory device 110-c based on determining the status of the memory device at 450. In some cases, the first circuit may generate the one or more second parameters based on interpreting or reconfiguring the one or more first parameters for readability. Additionally or alternatively, the one or more second parameters may be generated based on processing or performing computations using the one or more first parameters. The one or more second parameters may, at 465, be sent to another circuit of the host device (e.g., the safety engine 320 or the communication component 325), or to the device 405. In such cases, the one or more second parameters may be configured to be readable by another circuit of the host device 105-b or by another circuit of a device external to the host device (e.g., the device 405).

For example, the first circuit may send the one or more second parameters to the third circuit of the host device based on the one or more second parameters satisfying a condition. In some cases, the condition may include a threshold value of the one or more second parameters, a type of the one or more second parameters, an entity associated with the one or more second parameters, or a combination thereof. In some cases, the first circuit may send the one or more second parameters to the second circuit of the host device based on the one or more second parameters satisfying a condition. For example, the condition may include a threshold value of the one or more second parameters, a type of the one or more second parameters, an entity associated with the one or more second parameters, or a combination thereof. In such cases, the third circuit may, at 460, send the one or more second parameters to the device 405 based on the third circuit receiving the one or more second parameters, where the device 405 may be associated with a type of information indicated by the one or more second parameters.

At 470, the host device 105-b may determine one or more operational parameters, for example, at the first circuit or second circuit (e.g., the safety engine 320 described with reference to FIG. 3) based on the one or more first parameters or second parameters. For example, the host device 105-b may determine a voltage level of the memory device, a quantity of access operations for a component of the memory device, an operating temperature of a component of the memory device, or a combination thereof. In some cases, the first circuit may perform the determining, and the determining may further be based on the one or more first parameters or the one or more second parameters.

In other cases, the second circuit may perform the determining and may send an indication of the one or more operational parameters to the first circuit, or to a controller operable to transmit the operational parameter(s) to the memory device 110-c, based on determining the one or more operational parameters. The second circuit may perform the determining based on, for example, whether there is safety related information indicated by the first circuit, the set of one or more first parameters, the set of one or more second parameters, or any combination thereof. In such cases, the second circuit may determine one or more safety-related parameters (e.g., one or more operational parameters for the memory device 110-c), for example, to improve or maintain system safety.

Additionally or alternatively, the host device 105-b may, at 475, receive from the device 405 the one or more operational parameters at the third circuit (e.g., the communication component 325), for example, based part on transmitting the one or more first parameters or second parameters to the device 405 at 450 or 460, respectively. The third circuit may send an indication of the one or more operational parameters to the first circuit, or to a controller operable to transmit the operational parameter(s) to the memory device 110-c, based on receiving the one or more operational parameters.

At 480, the host device 105-b may transmit, to the memory device 110-c, a command associated with the one or more operational parameters, for example, based the status of the memory device. In some cases, transmitting the command to the memory device 110-c may be based on the indication of the one or more operational parameters received from the device 405. In some cases, transmitting the command to the memory device 110-c may be based on determining the one or more operational parameters at the host device 105-b (e.g., at the first or second circuit of the host device 105-b). The command may indicate the one or more operational parameters to the memory device 110-c, and may further instruct the memory device 110-c to operate according to the one or more operational parameters. Operating according to the operational parameter(s) may reduce a rate of degradation or a bit error rate of the memory device 110-c, or may increase a lifetime of the memory device 110-c, or both (e.g., among other examples).

Figure 5:
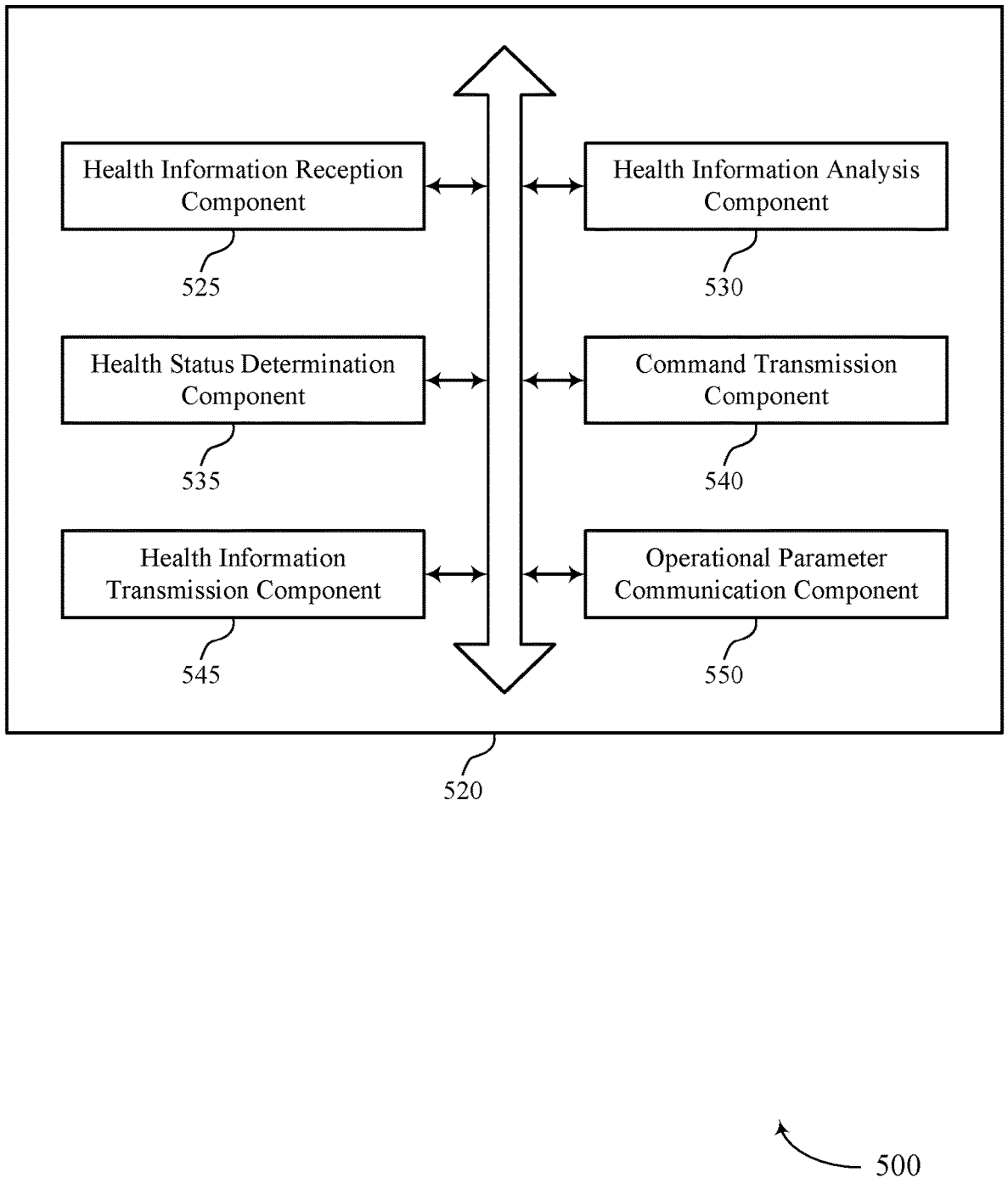
FIG. 5 shows a block diagram of a host device that supports memory device health evaluation at a host device in accordance with examples as disclosed herein.

FIG. 5 shows a block diagram 500 of a host device 520 that supports memory device health evaluation at a host device in accordance with examples as disclosed herein. The host device 520 may be an example of aspects of a host device as described with reference to FIGS. 1 through 4. The host device 520, or various components thereof, may be an example of means for performing various aspects of memory device health evaluation at a host device as described herein. For example, the host device 520 may include a health information reception component 525, a health information analysis component 530, a health status determination component 535, a command transmission component 540, a health information transmission component 545, an operational parameter communication component 550, or any combination thereof. Each of these components may communicate, directly or indirectly, with one another (e.g., via one or more buses).

The health information reception component 525 may be configured as or otherwise support a means for receiving, at a host device from a memory device, one or more first parameters indicative of a status of the memory device. The health information analysis component 530 may be configured as or otherwise support a means for sending the one or more first parameters to a first circuit of the host device based at least in part on identifying the first circuit as a destination for the one or more first parameters. The health status determination component 535 may be configured as or otherwise support a means for determining, at the first circuit, the status of the memory device based at least in part on the one or more first parameters. The command transmission component 540 may be configured as or otherwise support a means for transmitting, to the memory device, a command associated with one or more operational parameters that are based at least in part on the status of the memory device.

In some examples, None, and the health information analysis component 530 may be configured as or otherwise support a means for generating, at the first circuit, one or more second parameters indicative of the status of the memory device based at least in part on determining the status of the memory device, the one or more second parameters readable by another circuit of the host device or by another circuit of a device external to the host device, where the first circuit is for processing information indicative of the status of the memory device.

In some examples, the health information analysis component 530 may be configured as or otherwise support a means for sending the one or more second parameters from the first circuit to a second circuit of the host device based at least in part on the one or more second parameters indicating a safety status of the host device.

In some examples, the health information analysis component 530 may be configured as or otherwise support a means for determining the one or more operational parameters at the second circuit based at least in part on the one or more second parameters. In some examples, the health information analysis component 530 may be configured as or otherwise support a means for sending an indication of the one or more operational parameters from the second circuit to the first circuit based at least in part on determining the one or more operational parameters, where transmitting the command to the memory device is based at least in part on the indication of the one or more operational parameters.

In some examples, the health information analysis component 530 may be configured as or otherwise support a means for sending the one or more second parameters from the first circuit to a third circuit of the host device based at least in part on the one or more second parameters satisfying a condition that includes a threshold value of the one or more second parameters, a type of the one or more second parameters, or an entity associated with the one or more second parameters, or any combination thereof, where the third circuit is for communicating with one or more devices external to the host device. In some examples, the health information transmission component 545 may be configured as or otherwise support a means for transmitting, via the third circuit, the one or more second parameters to the device external to the host device based at least in part on sending the one or more second parameters, the device external to the host device associated with a type of information indicated by the one or more second parameters.

In some examples, the operational parameter communication component 550 may be configured as or otherwise support a means for receiving, from the device external to the host device, the one or more operational parameters at the third circuit based at least in part on transmitting the one or more second parameters. In some examples, the operational parameter communication component 550 may be configured as or otherwise support a means for sending an indication of the one or more operational parameters from the third circuit to the first circuit based at least in part on receiving the one or more operational parameters, where transmitting the command to the memory device is based at least in part on the indication of the one or more operational parameters.

In some examples, the one or more operational parameters include a voltage level of the memory device, a quantity of access operations for a component of the memory device, an operating temperature of a component of the memory device, or any combination thereof.

In some examples, the health information analysis component 530 may be configured as or otherwise support a means for generating, at the first circuit one or more second parameters indicative of the status of the memory device based at least in part on determining the status of the memory device. In some examples, the health information analysis component 530 may be configured as or otherwise support a means for sending the one or more second parameters to another circuit of the host device or to another circuit of a device external to the host device.

In some examples, the health information analysis component 530 may be configured as or otherwise support a means for determining the one or more operational parameters at the first circuit based at least in part on the one or more first parameters, where transmitting the command to the memory device is based at least in part on determining the one or more operational parameters.

In some examples, the health information analysis component 530 may be configured as or otherwise support a means for sending the one or more first parameters to a third circuit of the host device based at least in part on receiving the one or more first parameters, where the third circuit is for communicating with one or more devices external to the host device. In some examples, the health information transmission component 545 may be configured as or otherwise support a means for transmitting, via the third circuit, the one or more first parameters to a device external to the host device based at least in part on sending the one or more first parameters, the device external to the host device associated with a type of information indicated by the one or more first parameters.

In some examples, the operational parameter communication component 550 may be configured as or otherwise support a means for receiving, from the device external to the host device, the one or more operational parameters at the third circuit based at least in part on transmitting the one or more first parameters, where transmitting the command to the memory device is based at least in part on receiving the one or more operational parameters.

In some examples, the health information analysis component 530 may be configured as or otherwise support a means for receiving, at the first circuit from another circuit of the host device or from another circuit of a device external to the host device, one or more third parameters indicating a threshold status of the memory device, one or more parameters for monitoring at the memory device, one or more thresholds for the one or more first parameters, one or more processes for determining the one or more operational parameters, or any combination thereof, where the status of the memory device is determined based at least in part on the one or more third parameters.

In some examples, the health information reception component 525 may be configured as or otherwise support a means for receiving, at the host device from a second memory device, one or more fourth parameters indicative of a status of the second memory device, the one or more fourth parameters received sequentially to the one or more first parameters. In some examples, the health status determination component 535 may be configured as or otherwise support a means for determining, at the first circuit, the status of the second memory device based at least in part on the one or more fourth parameters.

In some examples, the status of the memory device is determined based at least in part on the one or more fourth parameters.

In some examples, to support determining the status of the memory device, the health status determination component 535 may be configured as or otherwise support a means for identifying a code represented by the one or more first parameters, the code indicative of the status of the memory device.

In some examples, the health information analysis component 530 may be configured as or otherwise support a means for storing data indicative of the one or more first parameters at non-volatile storage coupled with the host device based at least in part on receiving the one or more first parameters.

In some examples, the first circuit is operable to process information indicative of the status of the memory device, information indicative of a safety level of the host device, or any combination thereof.

Figure 6:
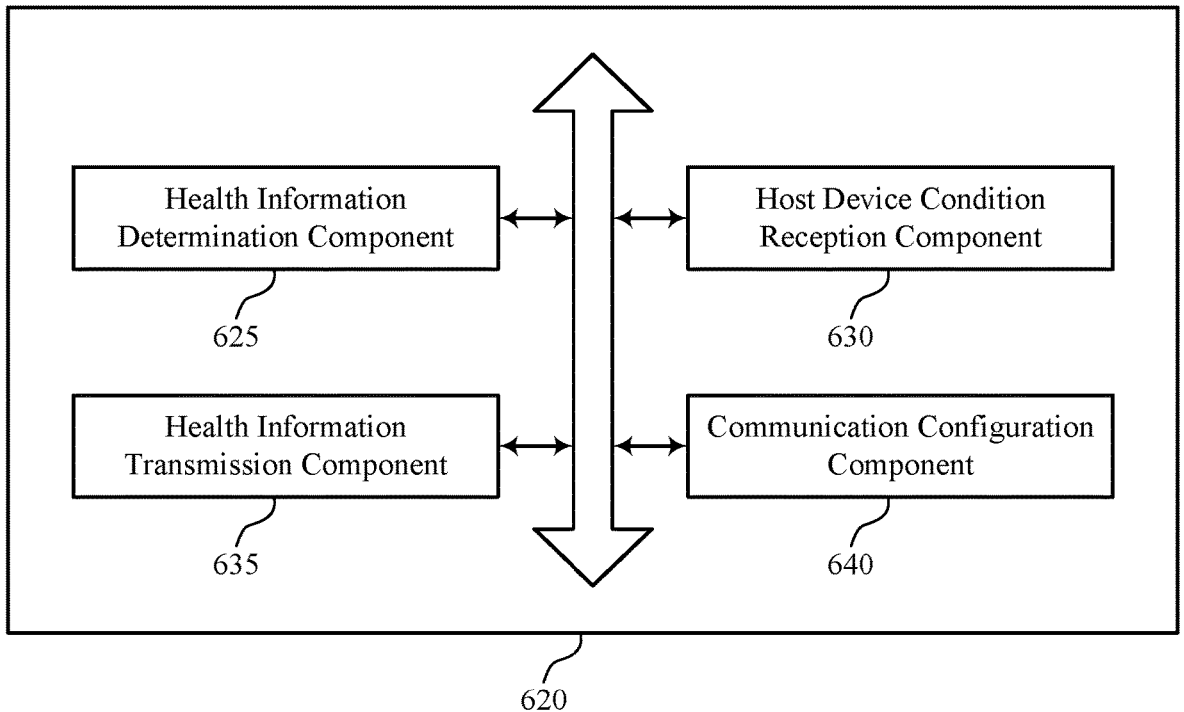
FIG. 6 shows a block diagram of a memory device that supports memory device health evaluation at a host device in accordance with examples as disclosed herein.

FIG. 6 shows a block diagram 600 of a memory device 620 that supports memory device health evaluation at a host device in accordance with examples as disclosed herein. The memory device 620 may be an example of aspects of a memory device as described with reference to FIGS. 1 through 4. The memory device 620, or various components thereof, may be an example of means for performing various aspects of memory device health evaluation at a host device as described herein. For example, the memory device 620 may include a health information determination component 625, a host device condition reception component 630, a health information transmission component 635, a communication configuration component 640, or any combination thereof. Each of these components may communicate, directly or indirectly, with one another (e.g., via one or more buses).

The health information determination component 625 may be configured as or otherwise support a means for determining, at a memory device, one or more parameters indicative of a status of the memory device. The host device condition reception component 630 may be configured as or otherwise support a means for receiving an indication of a condition of a host device to communicate the one or more parameters from the memory device based at least in part on determining the one or more parameters indicative of a status of the memory device. The health information transmission component 635 may be configured as or otherwise support a means for transmitting, to the host device, the one or more parameters indicative of the status of the memory device based at least in part on the condition of the host device and determining the one or more parameters indicative of the status of the memory device.

In some examples, the condition of the host device indicates that a first circuit of the host device for receiving the one or more parameters is operable to receive the one or more parameters from the memory device according to a configuration indicated by the memory device.

In some examples, the communication configuration component 640 may be configured as or otherwise support a means for transmitting, to the host device, the configuration for communicating the one or more parameters based at least in part on the condition of the host device.

In some examples, the communication configuration component 640 may be configured as or otherwise support a means for determining a configuration including an order for transmitting the one or more parameters based at least in part on the condition of the host device, where transmitting the one or more parameters is based at least in part on determining the configuration.

In some examples, the communication configuration component 640 may be configured as or otherwise support a means for determining a configuration including a content of the one or more parameters based at least in part on the condition of the host device, where transmitting the one or more parameters is based at least in part on determining the configuration.

Figure 7:
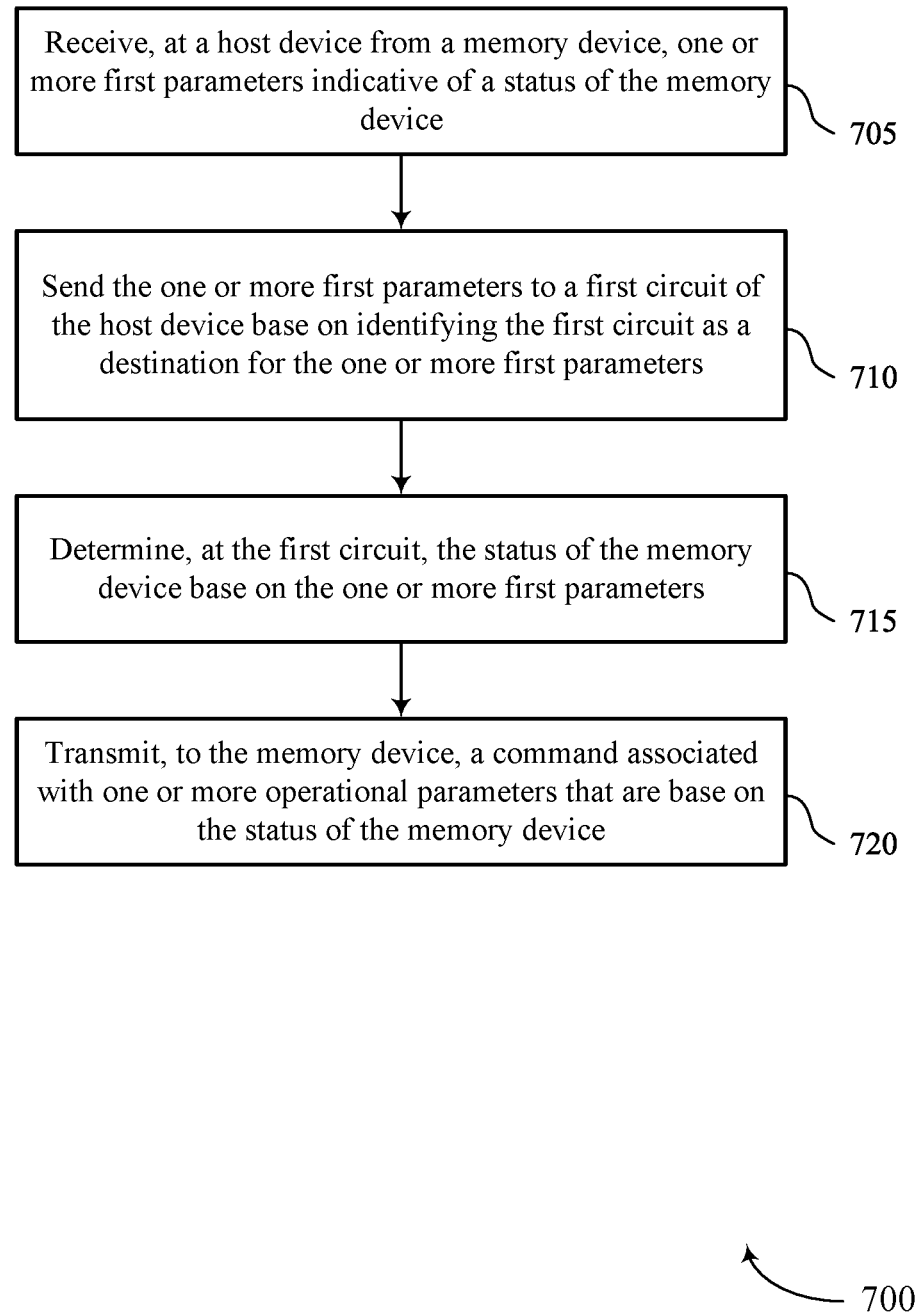
FIGS. 7 and 8 show flowcharts illustrating a method or methods that support memory device health evaluation at a host device in accordance with examples as disclosed herein.

FIG. 7 shows a flowchart illustrating a method 700 that supports memory device health evaluation at a host device in accordance with examples as disclosed herein. The operations of method 700 may be implemented by a host device or its components as described herein. For example, the operations of method 700 may be performed by a host device as described with reference to FIGS. 1 through 5. In some examples, a host device may execute a set of instructions to control the functional elements of the device to perform the described functions. Additionally or alternatively, the host device may perform aspects of the described functions using special-purpose hardware.

At 705, the method may include receiving, at a host device from a memory device, one or more first parameters indicative of a status of the memory device. The operations of 705 may be performed in accordance with examples as described with reference to FIGS. 3 and 4. In some examples, aspects of the operations of 705 may be performed by a health information reception component 525 as described with reference to FIG. 5.

At 710, the method may include sending the one or more first parameters to a first circuit of the host device based at least in part on identifying the first circuit as a destination for the one or more first parameters. The operations of 710 may be performed in accordance with examples as described with reference to FIGS. 3 and 4. In some examples, aspects of the operations of 710 may be performed by a health information analysis component 530 as described with reference to FIG. 5.

At 715, the method may include determining, at the first circuit, the status of the memory device based at least in part on the one or more first parameters. The operations of 715 may be performed in accordance with examples as described with reference to FIGS. 3 and 4. In some examples, aspects of the operations of 715 may be performed by a health status determination component 535 as described with reference to FIG. 5.

At 720, the method may include transmitting, to the memory device, a command associated with one or more operational parameters that are based at least in part on the status of the memory device. The operations of 720 may be performed in accordance with examples as described with reference to FIGS. 3 and 4. In some examples, aspects of the operations of 720 may be performed by a command transmission component 540 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor) for receiving, at a host device from a memory device, one or more first parameters indicative of a status of the memory device, sending the one or more first parameters to a first circuit of the host device based at least in part on identifying the first circuit as a destination for the one or more first parameters, determining, at the first circuit, the status of the memory device based at least in part on the one or more first parameters, and transmitting, to the memory device, a command associated with one or more operational parameters that are based at least in part on the status of the memory device.

In some examples of the method 700 and the apparatus described herein, and the method, apparatuses, and non-transitory computer-readable medium may include further operations, features, circuitry, logic, means, or instructions for generating, at the first circuit, one or more second parameters indicative of the status of the memory device based at least in part on determining the status of the memory device, the one or more second parameters readable by another circuit of the host device or by another circuit of a device external to the host device, where the first circuit may be for processing information indicative of the status of the memory device.

Some examples of the method 700 and the apparatus described herein may further include operations, features, circuitry, logic, means, or instructions for sending the one or more second parameters from the first circuit to a second circuit of the host device based at least in part on the one or more second parameters indicating a safety status of the host device.

Some examples of the method 700 and the apparatus described herein may further include operations, features, circuitry, logic, means, or instructions for determining the one or more operational parameters at the second circuit based at least in part on the one or more second parameters and sending an indication of the one or more operational parameters from the second circuit to the first circuit based at least in part on determining the one or more operational parameters, where transmitting the command to the memory device may be based at least in part on the indication of the one or more operational parameters.

Some examples of the method 700 and the apparatus described herein may further include operations, features, circuitry, logic, means, or instructions for sending the one or more second parameters from the first circuit to a third circuit of the host device based at least in part on the one or more second parameters satisfying a condition that includes a threshold value of the one or more second parameters, a type of the one or more second parameters, or an entity associated with the one or more second parameters, or any combination thereof, where the third circuit may be for communicating with one or more devices external to the apparatus and transmitting, via the third circuit, the one or more second parameters to the device external to the host device based at least in part on sending the one or more second parameters, the device external to the host device associated with a type of information indicated by the one or more second parameters.

Some examples of the method 700 and the apparatus described herein may further include operations, features, circuitry, logic, means, or instructions for receiving, from the device external to the host device, the one or more operational parameters at the third circuit based at least in part on transmitting the one or more second parameters and sending an indication of the one or more operational parameters from the third circuit to the first circuit based at least in part on receiving the one or more operational parameters, where transmitting the command to the memory device may be based at least in part on the indication of the one or more operational parameters.

In some examples of the method 700 and the apparatus described herein, the one or more operational parameters include a voltage level of the memory device, a quantity of access operations for a component of the memory device, an operating temperature of a component of the memory device, or any combination thereof.

In some examples of the method 700 and the apparatus described herein, generating, at the first circuit one or more second parameters indicative of the status of the memory device based at least in part on determining the status of the memory device and sending the one or more second parameters to another circuit of the host device or to another circuit of a device external to the host device.

Some examples of the method 700 and the apparatus described herein may further include operations, features, circuitry, logic, means, or instructions for determining the one or more operational parameters at the first circuit based at least in part on the one or more first parameters, where transmitting the command to the memory device may be based at least in part on determining the one or more operational parameters.

Some examples of the method 700 and the apparatus described herein may further include operations, features, circuitry, logic, means, or instructions for sending the one or more first parameters to a third circuit of the host device based at least in part on receiving the one or more first parameters, where the third circuit may be for communicating with one or more devices external to the apparatus and transmitting, via the third circuit, the one or more first parameters to a device external to the host device based at least in part on sending the one or more first parameters, the device external to the host device associated with a type of information indicated by the one or more first parameters.

Some examples of the method 700 and the apparatus described herein may further include operations, features, circuitry, logic, means, or instructions for receiving, from the device external to the host device, the one or more operational parameters at the third circuit based at least in part on transmitting the one or more second parameters, where transmitting the command to the memory device may be based at least in part on receiving the one or more operational parameters.

Some examples of the method 700 and the apparatus described herein may further include operations, features, circuitry, logic, means, or instructions for receiving, at the first circuit from another circuit of the host device or from another circuit of a device external to the host device, one or more third parameters indicating a threshold status of the memory device, one or more parameters for monitoring at the memory device, one or more thresholds for the one or more first parameters, one or more processes for determining the one or more operational parameters, or any combination thereof, where the status of the memory device may be determined based at least in part on the one or more third parameters.

Some examples of the method 700 and the apparatus described herein may further include operations, features, circuitry, logic, means, or instructions for receiving, at the host device from a second memory device, one or more fourth parameters indicative of a status of the second memory device, the one or more fourth parameters received sequentially to the one or more first parameters and determining, at the first circuit, the status of the second memory device based at least in part on the one or more fourth parameters.

In some examples of the method 700 and the apparatus described herein, the status of the memory device may be determined based at least in part on the one or more fourth parameters.

In some examples of the method 700 and the apparatus described herein, determining the status of the memory device may include operations, features, circuitry, logic, means, or instructions for identifying a code represented by the one or more first parameters, the code indicative of the status of the memory device.

Some examples of the method 700 and the apparatus described herein may further include operations, features, circuitry, logic, means, or instructions for storing data indicative of the one or more first parameters at non-volatile storage coupled with the host device based at least in part on receiving the one or more first parameters.

In some examples of the method 700 and the apparatus described herein, the first circuit may be operable to process information indicative of the status of the memory device, information indicative of a safety level of the host device, or any combination thereof.

Figure 8:
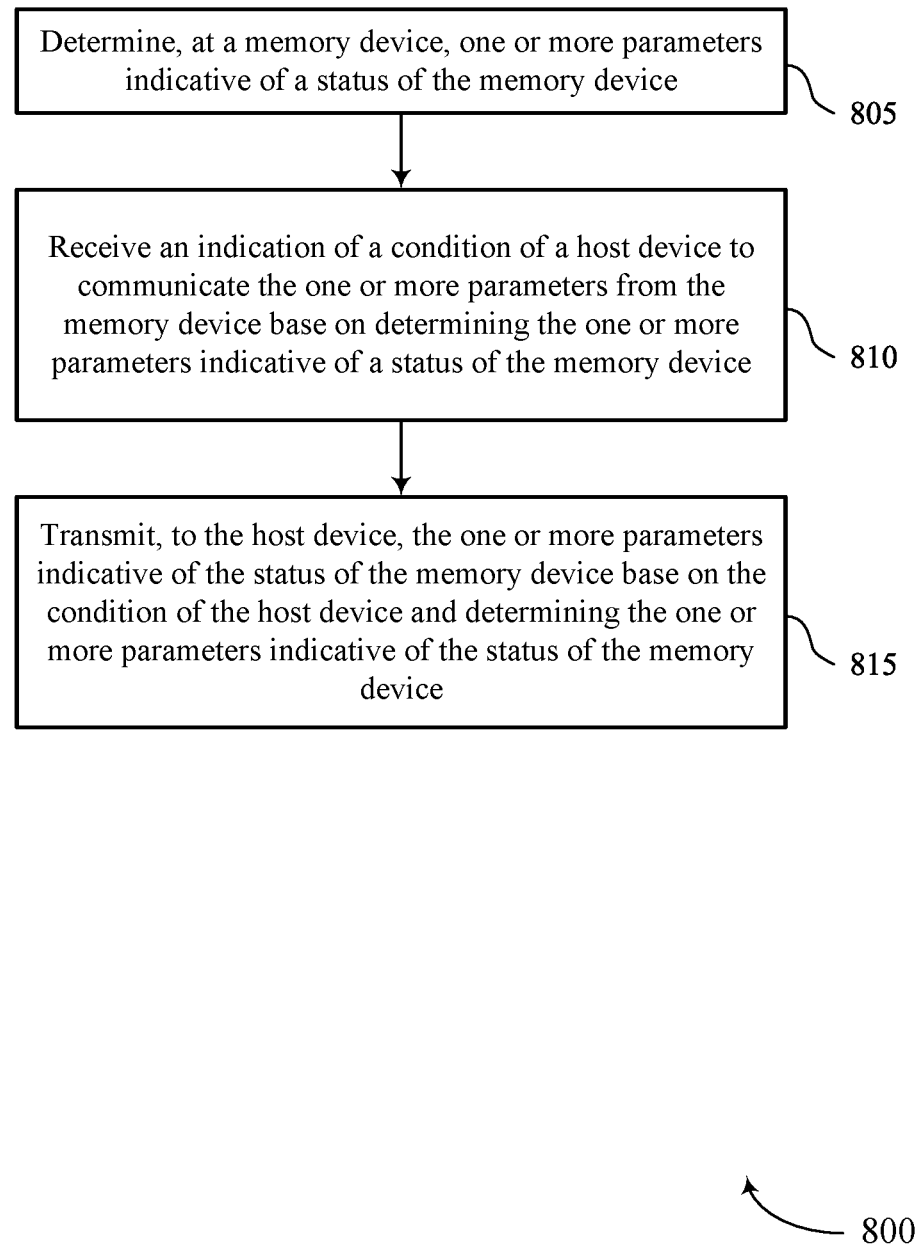

FIG. 8 shows a flowchart illustrating a method 800 that supports memory device health evaluation at a host device in accordance with examples as disclosed herein. The operations of method 800 may be implemented by a memory device or its components as described herein. For example, the operations of method 800 may be performed by a memory device as described with reference to FIGS. 1 through 4 and 6. In some examples, a memory device may execute a set of instructions to control the functional elements of the device to perform the described functions. Additionally or alternatively, the memory device may perform aspects of the described functions using special-purpose hardware.

At 805, the method may include determining, at a memory device, one or more parameters indicative of a status of the memory device. The operations of 805 may be performed in accordance with examples as described with reference to FIGS. 3 and 4. In some examples, aspects of the operations of 805 may be performed by a health information determination component 625 as described with reference to FIG. 6.

At 810, the method may include receiving an indication of a condition of a host device to communicate the one or more parameters from the memory device based at least in part on determining the one or more parameters indicative of a status of the memory device. The operations of 810 may be performed in accordance with examples as described with reference to FIGS. 3 and 4. In some examples, aspects of the operations of 810 may be performed by a host device condition reception component 630 as described with reference to FIG. 6.

At 815, the method may include transmitting, to the host device, the one or more parameters indicative of the status of the memory device based at least in part on the condition of the host device and determining the one or more parameters indicative of the status of the memory device. The operations of 815 may be performed in accordance with examples as described with reference to FIGS. 3 and 4. In some examples, aspects of the operations of 815 may be performed by a health information transmission component 635 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor) for determining, at a memory device, one or more parameters indicative of a status of the memory device, receiving an indication of a condition of a host device to communicate the one or more parameters from the memory device based at least in part on determining the one or more parameters indicative of a status of the memory device, and transmitting, to the host device, the one or more parameters indicative of the status of the memory device based at least in part on the condition of the host device and determining the one or more parameters indicative of the status of the memory device.

In some examples of the method 800 and the apparatus described herein, the condition of the host device indicates that a first circuit of the host device for receiving the one or more parameters may be operable to receive the one or more parameters from the memory device according to a configuration indicated by the memory device.

Some examples of the method 800 and the apparatus described herein may further include operations, features, circuitry, logic, means, or instructions for transmitting, to the host device, the configuration for communicating the one or more parameters based at least in part on the condition of the host device.

Some examples of the method 800 and the apparatus described herein may further include operations, features, circuitry, logic, means, or instructions for determining a configuration including an order for transmitting the one or more parameters based at least in part on the condition of the host device, where transmitting the one or more parameters may be based at least in part on determining the configuration.

Some examples of the method 800 and the apparatus described herein may further include operations, features, circuitry, logic, means, or instructions for determining a configuration including a content of the one or more parameters based at least in part on the condition of the host device, where transmitting the one or more parameters may be based at least in part on determining the configuration.

It should be noted that the methods described herein describe possible implementations, and that the operations and the steps may be rearranged or otherwise modified and that other implementations are possible. Further, portions from two or more of the methods may be combined.

Another apparatus is described. The apparatus may include a pin couplable with a memory device and operable to receive one or more first parameters indicative of a status of the memory device and a first circuit coupled with the pin and operable to receive the one or more first parameters via the pin based at least in part on the first circuit being a destination for the one or more first parameters and determine one or more operational parameters for the memory device based at least in part on determining the status of the memory device and the one or more first parameters, where the pin is further operable to transmit, to the memory device, a command associated with the one or more operational parameters based at least in part on determining the one or more operational parameters.

In some examples, the apparatus may include a controller coupled with the pin and operable to send the one or more first parameters to the first circuit based at least in part on identifying the first circuit as the destination for the one or more first parameters.

In some examples of the apparatus, the first circuit may be further operable to generate, one or more second parameters indicative of the status of the memory device based at least in part on determining the status of the memory device, the one or more second parameters readable by another circuit of the apparatus or by another circuit of a device external to the apparatus.

In some examples of the apparatus, the apparatus may include a second circuit operable to process information indicative of a safety level of the apparatus, where the second circuit may be operable to receive the one or more second parameters from the first circuit based on the one or more second parameters indicating a safety status of the host device, determine the one or more operational parameters based on the one or more second parameters, and send an indication of the one or more operational parameters to the first circuit based on determining the one or more operational parameters, where transmitting the command to the memory device is based on the indication of the one or more operational parameters.

In some examples, the apparatus may include a third circuit operable to communicate with one or more devices external to the apparatus, the third circuit operable to receive the one or more second parameters from the first circuit based at least in part on the one or more second parameters satisfying a condition that includes a threshold value of the one or more second parameters, a type of the one or more second parameters, or an entity associated with the one or more second parameters, or any combination thereof and transmit, via the third circuit, the one or more second parameters to the one or more devices external to the apparatus based at least in part on receiving the one or more second parameters.

In some examples, the apparatus may include receive, from the one or more devices external to the apparatus, the one or more operational parameters based at least in part on transmitting the one or more second parameters and send an indication of the one or more operational parameters to the first circuit based at least in part on receiving the one or more operational parameters, where transmitting the command to the memory device may be based at least in part on the indication of the one or more operational parameters.

In some examples, the apparatus may include determine the one or more operational parameters based at least in part on the one or more first parameters, where transmitting the command to the memory device may be based at least in part on determining the one or more operational parameters.

In some examples, the apparatus may include a third circuit operable to communicate with one or more devices external to the apparatus, the third circuit operable to receive the one or more first parameters via the pin and transmit, via the third circuit, the one or more first parameters to the one or more devices external to the apparatus based at least in part on receiving the one or more first parameters.

In some examples, the apparatus may include a second pin couplable with a second memory device and operable to receive one or more fourth parameters indicative of a status of the second memory device, where the second pin may be coupled with the first circuit, and where the first circuit may be further operable to determine the status of the second memory device based at least in part on the one or more fourth parameters.

In some examples of the apparatus, the first circuit may be operable to process information indicative of the status of the memory device, information indicative of a safety level of the apparatus, or any combination thereof.

Another apparatus is described. The apparatus may include a pin couplable with a host device and a controller coupled with the pin, the controller operable to determine one or more parameters indicative of a status of the apparatus, receive, from the host device and via the pin, an indication of a condition of the host device to communicate the one or more parameters from the apparatus based at least in part on determining one or more parameters indicative of a status of the apparatus, and transmit, to the host device and via the pin, the one or more parameters based at least in part on the condition of the host device and determining the one or more parameters indicative of the status of the apparatus.

In some examples, the apparatus may include transmit, to the host device and via the pin, a configuration for communicating the one or more parameters based at least in part on the condition of the host device.

Another apparatus is described. The apparatus may include a pin couplable with a memory device and a controller coupled with the pin, the controller operable to receive, from the memory device and via the pin, one or more first parameters indicative of a status of the memory device, send the one or more first parameters to a first circuit of the apparatus based at least in part on identifying the first circuit as a destination for the one or more first parameters, determine the status of the memory device based at least in part on the one or more first parameters, and transmit, to the memory device, a command associated with one or more operational parameters that are based at least in part on the status of the memory device.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

As used herein, the term "electrode" may refer to an electrical conductor, and in some examples, may be employed as an electrical contact to a memory cell or other component of a memory array. An electrode may include a trace, wire, conductive line, conductive layer, or the like that provides a conductive path between elements or components of a memory array.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
receiving, at a host device from a memory device, one or more first parameters indicative of a status of the memory device;
sending the one or more first parameters to a first circuit of the host device based at least in part on identifying the first circuit as a destination for the one or more first parameters;
determining, at the first circuit, the status of the memory device based at least in part on the one or more first parameters; and
transmitting, to the memory device, a command associated with one or more operational parameters that are based at least in part on the status of the memory device.

2. The method of claim 1, the method further comprising:
generating, at the first circuit, one or more second parameters indicative of the status of the memory device based at least in part on determining the status of the memory device, the one or more second parameters readable by another circuit of the host device or by another circuit of a device external to the host device, wherein the first circuit is for processing information indicative of the status of the memory device.

3. The method of claim 2, further comprising:
sending the one or more second parameters from the first circuit to a second circuit of the host device based at least in part on the one or more second parameters indicating a safety status of the host device.

4. The method of claim 3, further comprising:
determining the one or more operational parameters at the second circuit based at least in part on the one or more second parameters; and
sending an indication of the one or more operational parameters from the second circuit to the first circuit based at least in part on determining the one or more operational parameters, wherein transmitting the command to the memory device is based at least in part on the indication of the one or more operational parameters.

5. The method of claim 2, further comprising:
sending the one or more second parameters from the first circuit to a third circuit of the host device based at least in part on the one or more second parameters satisfying a condition that comprises a threshold value of the one or more second parameters, a type of the one or more second parameters, or an entity associated with the one or more second parameters, or any combination thereof, wherein the third circuit is for communicating with one or more devices external to the host device; and
transmitting, via the third circuit, the one or more second parameters to the device external to the host device based at least in part on sending the one or more second parameters, the device external to the host device associated with a type of information indicated by the one or more second parameters.

6. The method of claim 5, further comprising:
receiving, from the device external to the host device, the one or more operational parameters at the third circuit based at least in part on transmitting the one or more second parameters; and
sending an indication of the one or more operational parameters from the third circuit to the first circuit based at least in part on receiving the one or more operational parameters, wherein transmitting the command to the memory device is based at least in part on the indication of the one or more operational parameters.

7. The method of claim 1, wherein the one or more operational parameters comprise a voltage level of the memory device, a quantity of access operations for a component of the memory device, an operating temperature of a component of the memory device, or any combination thereof.

8. The method of claim 1, further comprising:
generating, at the first circuit, one or more second parameters indicative of the status of the memory device based at least in part on determining the status of the memory device; and
sending the one or more second parameters to another circuit of the host device or to another circuit of a device external to the host device.

9. The method of claim 1, further comprising:
determining the one or more operational parameters at the first circuit based at least in part on the one or more first parameters, wherein transmitting the command to the memory device is based at least in part on determining the one or more operational parameters.

10. The method of claim 1, further comprising:
sending the one or more first parameters to a third circuit of the host device based at least in part on receiving the one or more first parameters, wherein the third circuit is for communicating with one or more devices external to the host device; and
transmitting, via the third circuit, the one or more first parameters to a device external to the host device based at least in part on sending the one or more first parameters, the device external to the host device associated with a type of information indicated by the one or more first parameters.

11. The method of claim 10, further comprising:
receiving, from the device external to the host device, the one or more operational parameters at the third circuit based at least in part on transmitting the one or more first parameters, wherein transmitting the command to the memory device is based at least in part on receiving the one or more operational parameters.

12. The method of claim 1, further comprising:
receiving, at the first circuit from another circuit of the host device or from another circuit of a device external to the host device, one or more third parameters indicating a threshold status of the memory device, one or more parameters for monitoring at the memory device, one or more thresholds for the one or more first parameters, one or more processes for determining the one or more operational parameters, or any combination thereof, wherein the status of the memory device is determined based at least in part on the one or more third parameters.

13. The method of claim 1, further comprising:
receiving, at the host device from a second memory device, one or more fourth parameters indicative of a status of the second memory device, the one or more fourth parameters received sequentially to the one or more first parameters; and
determining, at the first circuit, the status of the second memory device based at least in part on the one or more fourth parameters.

14. The method of claim 13, wherein the status of the memory device is determined based at least in part on the one or more fourth parameters.

15. The method of claim 1, wherein determining the status of the memory device comprises:
identifying a code represented by the one or more first parameters, the code indicative of the status of the memory device.

16. The method of claim 1, further comprising:
storing data indicative of the one or more first parameters at non-volatile storage coupled with the host device based at least in part on receiving the one or more first parameters.

17. The method of claim 1, wherein the first circuit is operable to process information indicative of the status of the memory device, information indicative of a safety level of the host device, or any combination thereof.

18. An apparatus, comprising:
a pin couplable with a memory device and operable to receive one or more first parameters indicative of a status of the memory device; and
a first circuit coupled with the pin and operable to:
receive the one or more first parameters via the pin based at least in part on the first circuit being a destination for the one or more first parameters; and
determine one or more operational parameters for the memory device based at least in part on determining the status of the memory device and the one or more first parameters, wherein the pin is further operable to transmit, to the memory device, a command associated with the one or more operational parameters based at least in part on determining the one or more operational parameters.

19. The apparatus of claim 18, further comprising:
a controller coupled with the pin and operable to send the one or more first parameters to the first circuit based at least in part on identifying the first circuit as the destination for the one or more first parameters.

20. The apparatus of claim 18, wherein the first circuit is further operable to:
generate, one or more second parameters indicative of the status of the memory device based at least in part on determining the status of the memory device, the one or more second parameters readable by another circuit of the apparatus or by another circuit of a device external to the apparatus.

21. The apparatus of claim 20, wherein:
a second circuit operable to process information indicative of a safety level of the apparatus, wherein the second circuit is operable to:
receive the one or more second parameters from the first circuit based at least in part on the one or more second parameters indicating a safety status of the apparatus;
determine the one or more operational parameters based at least in part on the one or more second parameters; and
send an indication of the one or more operational parameters to the first circuit based at least in part on determining the one or more operational parameters, wherein transmitting the command to the memory device is based at least in part on the indication of the one or more operational parameters.

22. The apparatus of claim 20, further comprising:
a third circuit operable to communicate with one or more devices external to the apparatus, the third circuit operable to:
receive the one or more second parameters from the first circuit based at least in part on the one or more second parameters satisfying a condition that comprises a threshold value of the one or more second parameters, a type of the one or more second parameters, or an entity associated with the one or more second parameters, or any combination thereof; and
transmit, via the third circuit, the one or more second parameters to the one or more devices external to the apparatus based at least in part on receiving the one or more second parameters.

23. The apparatus of claim 22, wherein the third circuit is further operable to:
receive, from the one or more devices external to the apparatus, the one or more operational parameters based at least in part on transmitting the one or more second parameters; and
send an indication of the one or more operational parameters to the first circuit based at least in part on receiving the one or more operational parameters, wherein transmitting the command to the memory device is based at least in part on the indication of the one or more operational parameters.

24. The apparatus of claim 18, wherein the first circuit is operable to:
determine the one or more operational parameters based at least in part on the one or more first parameters, wherein transmitting the command to the memory device is based at least in part on determining the one or more operational parameters.

25. The apparatus of claim 18, further comprising:
a third circuit operable to communicate with one or more devices external to the apparatus, the third circuit operable to:
receive the one or more first parameters via the pin; and
transmit, via the third circuit, the one or more first parameters to the one or more devices external to the apparatus based at least in part on receiving the one or more first parameters.

26. The apparatus of claim 18, further comprising:
a second pin couplable with a second memory device and operable to receive one or more fourth parameters indicative of a status of the second memory device, wherein the second pin is coupled with the first circuit, and wherein the first circuit is further operable to determine the status of the second memory device based at least in part on the one or more fourth parameters.

27. The apparatus of claim 18, wherein the first circuit is operable to process information indicative of the status of the memory device, information indicative of a safety level of the apparatus, or any combination thereof.

28. An apparatus, comprising:
a pin couplable with a memory device; and
a controller coupled with the pin, the controller operable to:

receive, from the memory device and via the pin, one or more first parameters indicative of a status of the memory device;
send the one or more first parameters to a first circuit of the apparatus based at least in part on identifying the first circuit as a destination for the one or more first parameters;
determine the status of the memory device based at least in part on the one or more first parameters; and
transmit, to the memory device, a command associated with one or more operational parameters that are based at least in part on the status of the memory device.

\* \* \* \* \*